United States Patent
Smith

(10) Patent No.: US 8,449,663 B2
(45) Date of Patent: May 28, 2013

(54) WAX COMPOSITION, METHOD FOR MANUFACTURING, AND METHOD FOR WAXING

(75) Inventor: Kim R. Smith, Woodbury, MN (US)

(73) Assignee: ZEP IP Holding LLC, Atlanta, GA (US)

( * ) Notice: Subject to any disclaimer, the term of this patent is extended or adjusted under 35 U.S.C. 154(b) by 1920 days.

(21) Appl. No.: 11/216,957

(22) Filed: Aug. 31, 2005

(65) Prior Publication Data

US 2006/0100117 A1    May 11, 2006

Related U.S. Application Data

(60) Provisional application No. 60/626,130, filed on Nov. 8, 2004.

(51) Int. Cl.
*C09G 1/08*    (2006.01)

(52) U.S. Cl.
USPC .............................. 106/10; 106/271; 510/189

(58) Field of Classification Search
USPC ............ 106/3, 8, 10, 11, 14.22, 14.26, 14.34, 106/230, 270, 271, 660; 510/180, 181, 187, 510/189, 251, 259, 268, 365, 404, 405, 415, 510/418, 421, 433, 504; 252/8.63
See application file for complete search history.

(56) References Cited

U.S. PATENT DOCUMENTS

| | | | |
|---|---|---|---|
| 2,780,554 A * | 2/1957 | Lerner | 106/10 |
| 3,255,137 A * | 6/1966 | Hay et al. | 524/247 |
| 4,228,267 A | 10/1980 | Higashizume et al. | |
| 4,615,910 A | 10/1986 | Gasman | |
| 4,758,540 A | 7/1988 | Bard et al. | |
| 5,015,415 A | 5/1991 | Goze et al. | |
| 5,246,972 A | 9/1993 | Cifuentes et al. | |
| 5,494,593 A * | 2/1996 | Schleusener | 252/8.63 |
| 5,534,199 A | 7/1996 | Winkler, III | |
| 5,631,965 A | 5/1997 | Chang et al. | |
| 5,637,142 A | 6/1997 | Kubo et al. | |
| 5,664,520 A | 9/1997 | Latimer, III | |
| 5,763,379 A * | 6/1998 | Janota | 510/245 |
| 5,817,160 A | 10/1998 | Nagpal et al. | |
| 5,871,590 A | 2/1999 | Hei et al. | |
| 5,954,869 A | 9/1999 | Elfersy et al. | |
| 5,957,605 A | 9/1999 | Cohen et al. | |
| 6,120,587 A | 9/2000 | Elfersy et al. | |
| 6,211,139 B1 | 4/2001 | Keys et al. | |
| 6,220,311 B1 | 4/2001 | Litto | |
| 6,235,914 B1 | 5/2001 | Steiger et al. | |
| 6,376,455 B1 | 4/2002 | Friedli et al. | |
| 6,376,565 B1 | 4/2002 | Dyer et al. | |
| 6,458,343 B1 | 10/2002 | Zeman et al. | |
| 6,469,120 B1 | 10/2002 | Elfersy et al. | |

(Continued)

OTHER PUBLICATIONS

"Occupational health guideline for dipropylene glycol methyl ether" issued by the U.S. Department of Labor, Sep. 1978.*

*Primary Examiner* — Basia Ridley
*Assistant Examiner* — Heng Chan
(74) *Attorney, Agent, or Firm* — Hunton & Williams LLP

(57) ABSTRACT

A wax composition is provided according to the invention. The wax composition includes a wax component, a double tail surfactant component, and water. The weight ratio of the wax component to the double tail surfactant component, on a solids basis, is about 0.1 to about 1.25. A foam wax composition and a method for waxing are provided.

14 Claims, 3 Drawing Sheets

U.S. PATENT DOCUMENTS

| | | |
|---|---|---|
| 6,506,715 B1 | 1/2003 | Schultz et al. |
| 6,534,184 B2 | 3/2003 | Knasiak et al. |
| 6,660,828 B2 | 12/2003 | Thomas et al. |
| 6,706,923 B2 | 3/2004 | Haniff et al. |
| 6,750,277 B1 | 6/2004 | Yamana et al. |
| 6,753,373 B2 | 6/2004 | Winowiecki |
| 7,071,155 B2 * | 7/2006 | Griese et al. .................. 510/426 |
| 2005/0003990 A1 | 1/2005 | Smith et al. |

* cited by examiner

WAX COMPOSITION, METHOD FOR MANUFACTURING, AND METHOD FOR WAXING

CROSS REFERENCE TO RELATED APPLICATIONS

This application claims priority to U.S. Provisional Patent Application Ser. No. 60/626,130 that was filed with the United States Patent and Trademark Office on Nov. 8, 2004. The entire disclosure of U.S. Provisional Patent Application Ser. No. 60/626,130 is incorporated herein by reference.

FIELD OF THE INVENTION

The invention relates to a wax composition, a method for manufacturing a wax composition, and a method for waxing a surface. The wax composition can be used on the exterior surface of a motor vehicle to restore a glossy and/or shiny finish. The wax composition can be provided in the form of a foam.

BACKGROUND

Detailing waxes are used to touch-up vehicle finishes after application of an automotive wax to impart high gloss, shine, water resistance, and durability. Detailing waxes often include oils or waxes, and are often available as an opaque emulsion. In addition, detailing waxes are often applied as a liquid spray. Exemplary detailing waxes are commercially available under the names Meguiar's Next Generation Spray Wax available from Meguiar's, Inc., Express Shine available from Turtle Wax, Inc., and Mother's California Gold Showtime Instant Detailer available from Mother's Polishes Waxes Cleaners Inc.

Numerous compositions are available for washing and waxing automotive exterior surfaces. For example, see U.S. Pat. No. 6,506,715 to Schultz et al.

Compositions applied to the exterior surface of an automobile to provide a glossy finish are available under the names Cold Wax and Ultra Shine G-T spotter from Ecolab Inc.

SUMMARY OF THE INVENTION

Figure 1:
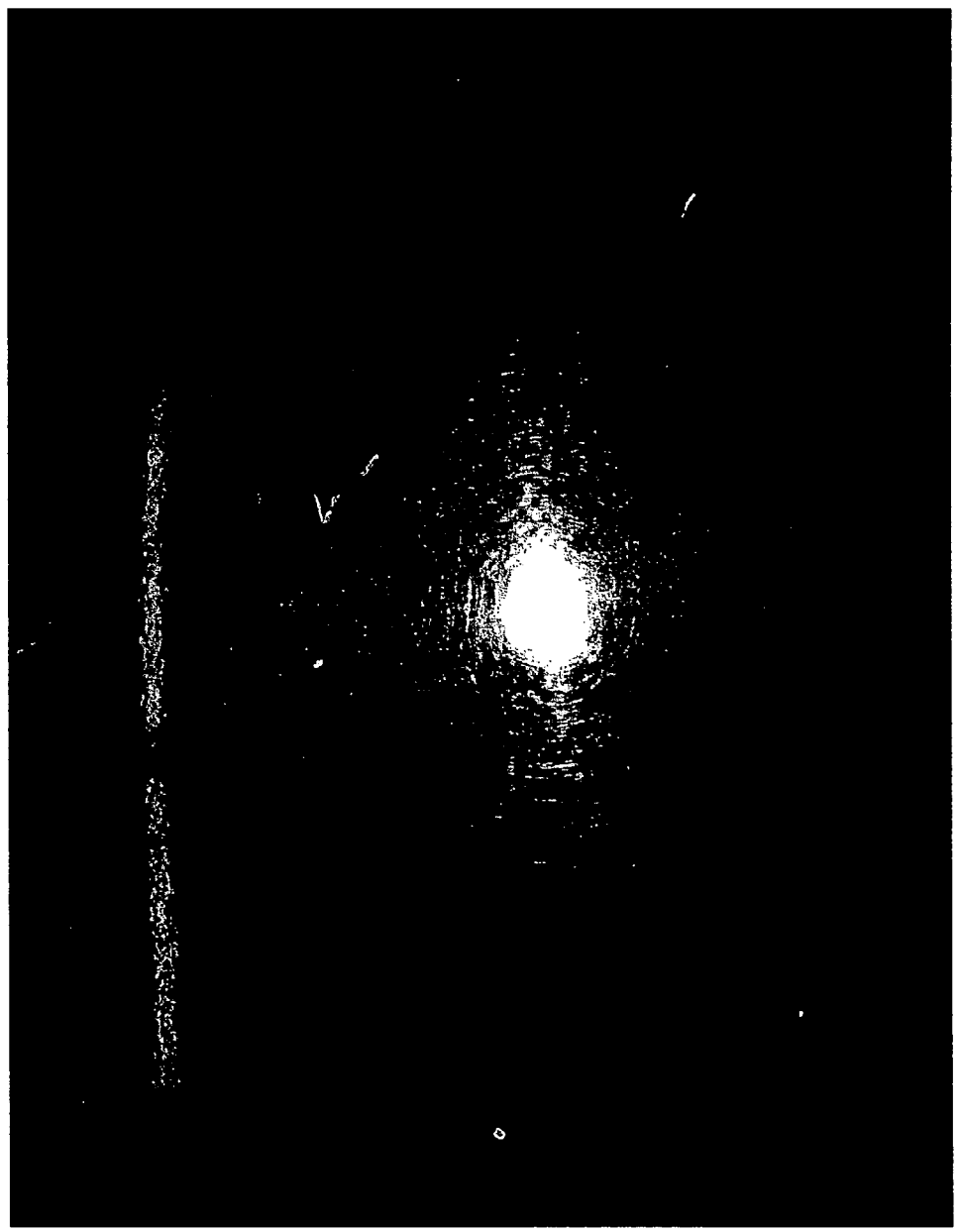
FIG. 1 is a photograph showing a waxed automobile surface where the paint has dulled as a result of water spotting.

A wax composition is provided according to the invention. The wax composition includes a wax component, a double tail surfactant component, and water. The weight ratio of the wax component to the double tail surfactant component, on a solids basis, is about 0.1 to about 1.5.

A foam wax composition is provided according to the invention. The foam wax composition includes a wax component, a surfactant component, water, and a foam boosting solvent. The foam wax composition exhibits at least 50 wt. % foam according to a 15 second vertical separation test after foaming in a mechanical foaming head. The test can be carried out by spraying the composition as a foam onto a vertical surface such as glass, waiting 15 seconds after application of the foam to the vertical surface, and then taking up the liquid portion and the foam portion in separate preweight paper towels. The weight of the absorbed liquid can be calculated and the weight of the absorbed foam can be calculated. By providing a separation time of at least 15 seconds, it is believed that a reasonable amount of separation of liquid and foam can be achieved. The towel picking up the liquid portion should not pick up any of the foam portion, and the towel picking up the foam portion should not pick up the liquid portion that has fallen below the foam portion. It is understood that the foam portion may still include a small amount of associated liquid. However, this associated liquid is considered part of the foam as long as it remains with the foam at the 15 second cut off time. The weight percent foam can be calculated by dividing the weight of the foam component by the total weight and multiplying by 100.

A method for waxing a surface is provided according to the invention. The method includes a step of applying a wax composition to a surface. The wax composition can be applied as a foam or as a liquid that is sprayed onto the surface or applied using an applicator. The method additionally includes a step of rubbing the wax composition onto the surface.

A method for manufacturing a wax composition is provided according to the invention. The method includes steps of mixing a double tail surfactant, a foam boosting solvent, and water to provide a surfactant and solvent mixture, and then mixing in a wax component to provide the wax composition, wherein the weight ratio of the wax component to the double tail surfactant component on a solids basis is about 0.1 to about 1.5.

DETAILED DESCRIPTION OF THE INVENTION

The wax composition according to the invention can be characterized as a detailing wax or as a touch-up wax. In general, a detailing wax can be used to help restore the shine or gloss on an automotive exterior surface after the surface has been waxed. Isolated areas on an automotive exterior surface are often soiled or marred in some manner. For example, the presence of fingerprints and/or water spots in certain areas on an automotive exterior surface may detract from a vehicle's shine or gloss. In addition, bird droppings may soil a vehicle surface and, if left on the vehicle, harm the clear coat finish. The detailing wax or touch-up wax can be used to restore the shine or gloss. It should be understood that the reference to an "automotive exterior surface" refers to the exterior surface that is typically painted and coated with a clear coat or wax finish on a motor vehicle such as a car or truck. It should be understood that the wax composition can have application to other surfaces.

The wax composition can be made available as a ready to use composition. That is, the wax composition can be applied directly to a vehicle surface without having to dilute the wax composition. Alternatively, the wax composition can be available as a concentrate that can be diluted to provide a ready to use composition. In general, the wax composition is intended to be rubbed into or onto an automotive exterior surface. It is expected that some of the wax composition will remain on the automotive exterior surface after it has been rubbed into or onto the surface. Because some of the wax composition is expected to remain on the automotive exterior surface, the wax composition can be characterized as a leave behind composition.

The ready to use wax composition can be provided as a liquid that can be applied to an automotive exterior surface. The wax composition can be sprayed as a liquid or as a foam onto a surface, or it can be applied to a surface using an applicator such as a sponge, cloth, or pad.

As used in this application, the phrase "weight percent" or "wt. %" can be used interchangeably and refer to the percentage of a component, based on weight, in the total composition wherein the component is characterized as 100% active or solid. It should be understood that certain components are commercially available at a percent actives or solids of less than 100%.

The wax composition includes a wax component, a surfactant component, and water. The wax composition can have a pH of about 6 to about 8. In addition, the wax composition can include a pH adjusting agent to provide the desired pH level, and the wax composition can include a solvent that assists in the generation of a foam when the composition is processed through a mechanical foaming head.

The wax component is provided to restore the gloss, shine, water resistance or durability to the automotive exterior surface. The wax component can be a water insoluble oil, a wax, or a mixture of a water insoluble oil and a wax. The wax component can be available for incorporation into the wax composition in a "solid" form, as a liquid, or as an emulsion in a solvent such as water. It should be understood that the characterization of the wax component as a "solid" refers to the general absence of solvent such as water in an amount that causes the wax component to be in the form of a liquid. Exemplary water insoluble oils that can be used include mineral oils, linear paraffins, branched paraffins, alkyl methyl esters, soy oil, and other natural oils. Exemplary waxes that can be used include carnauba wax, polyethylene, copolymers of polyethylene, oxidized polyethylene, copolymers of oxidized polyethylene, silicones, derivatives of silicones, polyethers, and montan waxes. In addition, the wax component can be provided as mixtures of various water insoluble oils, mixtures of various waxes, and mixtures of water insoluble oils and waxes. It should be understood that certain waxes can be provided as blends of various waxes and are not necessarily provided as a "pure" wax. An exemplary wax that can be used according to the invention is available under the name Tomah C-340 wax emulsion from Tomah Products, Incorporated, and contains 15% carnauba wax. It is believe that other components such as emulsifiers may be present in the Tomah C-340 wax emulsion.

The wax composition includes a sufficient amount of the wax component to provide the wax composition with properties that help restore the gloss or shine to an automotive exterior surface. In general, a desired level of wax component (on a solids basis) in the wax composition can be about 0.01 wt. % to about 20 wt. %. In addition, the amount of the wax component in the wax composition can be about 0.1 wt. % to about 10 wt. %, and can be about 0.2 wt. % to about 5 wt. %. It should be understood that the characterization of a "solids basis" refers to the amount of the wax without regard to whatever else may be present therewith in its commercially available form.

The wax component includes a surfactant component sufficient to solubilize the wax component so that the wax composition avoids phase separation. An exemplary surfactant component that can be used can be referred to as a double tail surfactant. Double tail surfactants may be anionic, cationic, nonionic, amphoteric or mixtures thereof. Preferred double tail surfactants that can be used according to the invention include cationic double tail surfactants. A double tail surfactant has the general structure:

$$R_1\text{-}A\text{-}R_2$$

wherein the substituents $R_1$ and $R_2$ can be the same or different, and are independently selected from groups containing $C_6$-$C_{24}$. $R_1$ and $R_2$ may be linear or nonlinear alkyl, aryl, or aralkyl groups. Preferably, $R_1$ and $R_2$ are linear alkyl groups. Preferably, $R_1$ and $R_2$ have an equal or nearly equal number of carbon atoms. A nearly equal number of carbon atoms means that one group has a number of carbon atoms within about 4 carbon atoms of the other group. The substituents $R_1$ and $R_2$ can contain N, O, S, or P heteroatoms and/or can contain ester, amide, carbonyl, thiol, hydroxy, or amine moieties. The substituent "A" can be a charged or uncharged moiety and is selected to provide the surfactant with surface active properties in conjunction with the substituents $R_1$ and $R_2$. The substituent "A" can be, for example, an alkoxylate, a derivative of an alkoxylate, a glycoside, a derivative of a glycoside, an amide, an amine, a salt of an amine, derivative of an amine, a carboxylate, a sulfate, a sulfonate, a quaternary nitrogen, a sulphur, a phosphorus, a sultaine, a betaine, an amphoacetate, an amphoproprionate, or an amine oxide. An exemplary double tail surfactant that can be used according to the invention includes didecyldimethylammonium chloride.

The wax composition can include the surfactant in an amount sufficient to solubilize the wax component so that the wax composition avoids phase separation. In the case where the double tail surfactant is used as the surfactant component, the double tail surfactant can be provided in the ready to use composition in an amount of about 0.01 wt. % to about 20 wt. %. In addition, the wax composition can include the double tail surfactant in an amount of about 0.1 wt. % to about 10 wt. %, and about 0.2 wt. % to about 5 wt. %. In general, the amount of the double tail surfactant is selected to provide the desired level of solubilization of the wax component. It is expected that the weight ratio of the wax component (on a solids basis) to the double tail surfactant (on a solids basis) can be 1.5 or less. In general, it is expected that the weight ratio of the wax to the double tail surfactant can be about 0.1 to about 1.5, and can be about 0.2 to about 1.25.

The wax composition can be provided with a pH that is sufficiently neutral to avoid harming the clear coat on the exterior surface of a motor vehicle. Because the wax composition is intended to be left on the exterior surface of a motor vehicle, the wax composition should not detract or harm the clear coat on the motor vehicle. It has been found that if the wax composition has a pH that is too low or too high, damage of the clear coat may result. Accordingly, the pH of the wax composition should be sufficient to avoid damaging a clear coat on a motor vehicle after prolonged exposure. An exemplary pH range that can be characterized as relatively neutral is a pH of about 6 to about 8. The pH of the wax composition can be controlled by the incorporation of a pH adjusting agent. Exemplary pH adjusting agents include amines, acids, carbonates, and bicarbonates. An exemplary pH adjusting agent that can be used includes 2-amino-2-methyl-1-propanol that is commonly referred to as isopropanolamine. It should be understood that the pH adjusting agent is not a required component of the wax composition. That is, if the wax composition is provided with a desired pH without the use of a pH adjusting agent, the pH adjusting can be omitted. In addition, it should be understood that the pH of the wax composition can be outside of the range of about 6 to about 8 as long as the wax composition does not harm the surface to which it is applied.

The wax composition can include water as a carrier. The water can be provided in a form that does not include a substantial amount of components that would detract from the gloss or shine on an automotive exterior surface when the wax composition is applied thereto. The water provided in the wax composition can be treated so that it is characterized as deionized water, reverse osmosis water, or softened water. The amount of water in the wax composition depends on whether the wax composition is characterized as a concentrate or a ready to use composition. If the wax composition is provided as a concentrate, it is expected that it will be diluted with water to provide a ready to use composition. In general, the ready to use composition will include water in an amount of about 30 wt. % to about 99 wt. %. In addition, the ready to use composition can include water in an amount of about 60 wt. % to about 99 wt. %, and about 80 wt. % to about 98 wt. %.

Additional components that can be incorporated into the wax composition include aesthetic aids, lubricants, UV protectants, preservatives, and other surface protectants. It should be understood that these components are not required and may or may not be present in the wax composition. Exemplary aesthetic aids include fragrances, dyes, and colorants. Exemplary lubricants include fluorochemicals, silanes, and siloxanes.

The wax composition can include a solvent to assist in the generation of foam when the composition is processed through a mechanical foaming head. Solvents that assist in the generation of a foam can be referred to as "foam-boosting solvents." Mechanical foaming heads that can be used according to the invention to provide foam generation includes those heads that cause air and the composition to mix and create a foamed composition. That is, the mechanical foaming head causes air and the wax composition to mix in a mixing chamber and then pass through an opening to create a foam. Techniques for foaming a wax composition using a mechanical foaming head are disclosed in U.S. application Ser. No. 10/852,591 that was filed with the United States Patent and Trademark Office on May 24, 2004. The entire disclosure of U.S. application Ser. No. 10/852,591 is incorporated herein by reference.

The wax composition according to the invention can be foamed without the use of a propellant normally associated with aerosol compositions. In general, aerosol compositions include a pressurized container for storing a composition and a propellant. The expansion of the propellant in the composition and propellant mixture as it passes through a nozzle causes the aerosol composition to become foamed. The mechanical foaming head, in contrast, relies upon air from the environment and causes the air to mix with the liquid composition to become foamed. While it is understood that operating the mechanical foaming head may result in a compression of the air within the mixing chamber, it is pointed out that the container that stores the wax composition is not considered pressurized even though the pressure inside the container may be slightly higher or lower than ambient pressure at times. Propellants that are often used in aerosols include liquids that form gases when expanded to atmospheric pressure. Exemplary propellants commonly used in aerosols include fluorocarbons, chlorofluorocarbons, and alkanes such as butane, ethane, isobutane, and propane. Propellants in general and these propellants in particular can be excluded from the wax composition according to the invention or they can be limited to an amount, if any are present, that is insufficient to provide foaming of the composition as a result of pressure drop (such as through an aerosol nozzle) so that the composition contains at least 50 wt. % foam according to a 15 second vertical separation test. Air has a tendency not to compress to a liquid under conditions normally encountered in conventional aerosol devices. Air is not considered a propellant according to the present invention even though it may be slightly compressed using the mechanical foaming head according to the invention. The term "propellant" as used herein should be understood to not refer to air and can be characterized as non-air containing propellants. The foamed wax composition according to the invention can be characterized as having been formed by air rather than by a propellant. Because propellants are typically provided in a liquid form in combination with a liquid to be foamed, and form bubbles in the liquid as the propellant vaporizes as pressure drops, it is expected that the foam that is foamed by a propellant will contain residual propellant. It is believed that the residual propellant can be measured by a gas chromatographic head space analysis. It is expected that foams produced using a propellant will exhibit a concentration of propellant in the foam of greater than 1 ppm. Accordingly, the foamed wax composition according to the invention includes less than 1 ppm propellant as measured by a gas chromatographic head space analysis. Preferably, the foam according to the invention has no propellant. That is, the foam according to the invention can be produced using air and need not be produced using a propellant.

Because the foam according to the invention can be prepared without a propellant, the container that holds the liquid wax composition can be constructed so that that it is capable of holding the wax composition under substantially atmospheric conditions both inside and outside the container. Because propellants are not used, the container need not be a container capable of withstanding the pressures normally associated with aerosol containers. Accordingly, the container can be provided from a plastic or polymer material rather than from a metallic material normally associated with aerosol containers.

Exemplary mechanical foaming heads that can be used according to the invention include those available from Airspray International, Inc. of Pompano Beach, Fla., and from Zeller Plastik, a division of Crown Cork and Seal Co. Exemplary mechanical foaming heads that can be used according to the invention are described in, for example, U.S. Pat. No. D-452,822; U.S. Pat. No. D-452,653; U.S. Pat. No. D-456,260; and U.S. Pat. No. 6,053,364. Mechanical foaming heads that can be used according to the invention includes those heads that are actuated or intended to be actuated by application of finger pressure to a trigger that causes the wax composition and air to mix and create a foam. That is, a person's finger pressure can cause the trigger to depress thereby drawing the wax composition and air into the head and causing the wax composition and air to mix and create a foam.

Not all solvents will necessarily function as foam-boosting solvents to cause a composition to foam when processed through a mechanical foaming head. Certain types of solvents that have been found to function as foam-boosting solvents can be characterized in several ways. For example, foam-boosting solvents that have assisted in the generation of a foam when a composition is processed through a mechanical foaming head can be characterized as having an HLB (hydrophilic-lipophilic balance) value of at least about 6.9 and an OHLB (organic hydrophilic-lipophilic balance) value of about 12 to about 20. HLB is a measure of water miscibility with values of 7.3 or greater corresponding to complete water solubility. OHLB values refer to the partitioning ability between water and organic phase with higher OHLB values corresponding to a greater tendency to partition into the organic phase. HLB values and OHLB values for solvents are readily available for most solvents. Exemplary foam-boosting solvents that can be used according to the invention can also be characterized as having a vapor pressure at room temperature of less than about 5 mmHg. The vapor pressure at room temperature can be less than about 1 mmHg, and can be less than about 0.1 mmHg. In addition, it may be desirable to provide the foam-boosting solvent as one characterized as GRAS (generally recognized as safe) by the FDA for direct or indirect food additives.

Exemplary foam-boosting solvents include glycols, glycol ethers, derivatives of glycol ethers, and mixtures thereof. Exemplary glycols include those having at least four carbon atoms such as hexylene glycol. Exemplary glycol ethers include alkylene glycol ethers and aromatic glycol ethers. Exemplary glycol ethers include those having the formula:

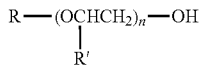

wherein R is a $C_1$-$C_6$ aliphatic or aromatic group, R' is H, $CH_3$, or $C_2H_5$, and n has a value of at least 1. The value of n can be between about 1 and about 4, and can be between about 1 and about 3. An exemplary glycol ether includes dipropylene glycol methyl ether wherein R is $CH_3$, R' is $CH_3$, and n has a value of 2. Another exemplary glycol ether is diethylene glycol butyl ether (sometimes referred to as butyl carbitol) wherein R is $C_4H_9$, R' is H, and n has a value of 2. An exemplary aromatic glycol ether is ethylene glycol phenyl ether where R is a phenyl group, R' is H, and n is a value of 1. Other exemplary glycol ethers include $C_1$-$C_6$ alkylene glycol ethers such as propylene glycol butyl ether, dipropylene glycol propyl ether, ethylene glycol butyl ether, diethylene glycol propyl ether, and triethylene glycol methyl ether. Exemplary glycol ethers are commercially available under the name Dowanol® from the Dow Chemical Company. For example, n-propoxypropanol is available under the name Dowanol PnP. Exemplary derivatives of glycol ethers include those glycol ethers modified to include an additional group or functionality such as an ester group. Exemplary derivatives of glycol ethers include those having the following formula:

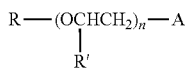

wherein R is a $C_1$-$C_6$ aliphatic or aromatic group, R' is H, $CH_3$, or $C_2H_5$, n has a value of at least 1, and A is an ester, amide, or ether group. The value of n can be between about 1 and about 4, and can be between about 1 and about 3. An exemplary derivative of a glycol ether includes propylene glycol methyl ether acetate. It should be understood that certain glycol ethers and derivatives such as ethylene glycol phenyl ether can be used with additional solvents for coupling.

The wax composition can include an amount of the foam-boosting solvent to provide a desired foam when processed through a mechanical foaming head. It has been found that the amount of foam-boosting solvent that can be provided to assist in the generation of a foam can be provided in an amount that does not significantly decrease the viscosity of the composition prior to foaming. That is, the amount of the foam-boosting solvent can be provided so that the composition that includes the foam-boosting solvent has a viscosity that is within about 50 centipoise of an otherwise identical composition except not including the foam-boosting solvent when the viscosity is measured on a Brookfield viscometer, model DV-E, at 22° C. a spindle speed of 100 rpm and a number 4 spindle, or at a spindle and speed that provides for measurement of viscosity. It is expected that the foam-boosting solvent will be present in the composition in an amount of at least about 0.1 wt. %, and can be included in an amount up to about 5 wt. %. An exemplary range of foam-boosting solvent in the composition is between about 0.5 wt. % and about 3 wt. %. Another exemplary range of the foam-boosting solvent is between about 1 wt. % and about 2 wt. %.

It is believed that the foam-boosting solvent can be provided in a composition containing a relatively low concentration of surfactant to help assist in the generation of a foam when processed through a mechanical foaming head. The amount of the foam-boosting solvent can be provided based upon the amount of total surfactant in the composition. For example, when the total amount of surfactant is relatively low, it is desirable to provide enough foam-boosting solvent so that the composition generates a foam when processed through a mechanical foaming head. An exemplary low concentration of total surfactant is about 0.05 wt. %. It is expected that at total surfactant concentrations of about 0.05 wt. % to about 10 wt. %, the foam-boosting solvent can be provided at a concentration of about 0.1 wt. % to about 5 wt. %, a concentration of between about 0.5 wt. % and about 3 wt. %, and a concentration of between about 1 wt. % and about 2 wt. %. In addition, the amount of foam-boosting solvent can be characterized as a weight ratio of the foam-boosting solvent to total surfactant in the composition. The weight ratio of foam-boosting solvent to total surfactant in the composition can be at least about 1:100 and can be up to about 100:1. The ratio of the foam-boosting solvent to total surfactant in the composition can be between about 1:40 and about 40:1, and can be between about 0.5:1 and about 20:1. In general, it is expected that as the concentration of surfactant increases, there may be less need for the foam-boosting solvent in order to obtain the desired level of foaming. In addition, for compositions that contain a total surfactant concentration in excess of 10 wt. %, it is expected that the composition can be designed so that it generates foaming without the use of a foam-boosting solvent. However, it is expected that in certain compositions that may even contain in excess of 10 wt. % total surfactant, a foam-boosting solvent may be used to enhance foaming. It should be understood that the weight percent surfactant as used herein refers to the weight percent based on a surfactant composition that is 100 percent active (i.e. not containing water). It should be understood that the surfactant composition can contain water but the measurement of the amount is based upon a 100 percent active composition.

When the wax composition is provided as a foam, the composition has a cellular structure that can be characterized as having several layers of air cells that provide the wax composition with a foamy appearance. It should be understood that the characterization of a foam refers to the existence of more than simply a few air bubbles. In general, a foam can be characterized as having at least 50 wt. % foam using a 15 second vertical separation test. The test is carried out by spraying the wax composition as a foam onto a vertical surface such as glass, waiting 15 seconds after application of the foam to the vertical surface, and then taking up the liquid portion and the foam portion in separate preweighted paper towels. The weight of the absorbed liquid can be calculated and the weight of the absorbed foam can be calculated. By providing a separation time of at least 15 seconds, it is believed that a reasonable amount of separation of liquid and foam can be achieved. The towel picking up the liquid portion should not pick up any of the foam portion, and the towel picking up the foam portion should not pick up the liquid portion that has fallen below the foam portion. It is understood that the foam portion may still include a small amount of associated liquid. However, this associated liquid is considered a part of the foam as long as it remains with the foam at the 15 second cut off time. The weight percent foam can be calculated by dividing the weight of the foam component by the total weight and multiplying by 100. The 15 second vertical separation test can be referred to as a "gravimetric foam test after 15 seconds." The wax composition preferably provides at least 70 wt. % foam according to the gravimetric foam test after 15 seconds, more preferably at least about 90 wt. % foam, and even more preferably at least about 95 wt. % foam. In general, it is desirable to have the foam hang up and not fall down a vertical surface to provide desired contact time and to allow a person sufficient time to work the foam at its intended location. The period of 15 seconds is selected for the test because it is expected that a foam will likely "hang" for at least about 15 seconds and any free liquid, if present at all, will have an opportunity to separate from the foam and fall down the vertical surface. In addition, the foam persists for at least about 15 seconds after application to a surface. This means that the foam will have a tendency to remain as a foam and will resist condensing to a liquid in order to provide the above-identified weight percent foam. More preferably, the foam persists for at least about 1 minute after application to the surface.

Various components found in commercially available automotive exterior "wax compositions" and cleaning compositions can be excluded from the wax composition according to the invention. If not entirely excluded, the components can be excluded at levels above which they would provide their intended function. In general, this often refers to a level above about 0.5 wt. % in the ready to use composition. The level above which these components can be excluded can be above about 0.1 wt. %, and can be above 0.05 wt. %, based on the ready to use composition. An exemplary type of component that can be excluded from the wax composition according to the invention is a hydrotrope component such as an anionic hydrotrope. An exemplary hydrotrope that can be excluded includes sodium xylene sulfonate. An additional component that can be excluded from the wax composition includes sodium cumene sulfonate.

The wax composition can be prepared by particular processing steps so that the composition results as a solution. In general, the double tail surfactant and foam boosting solvent can be added to water and mixed. The wax component can then be added and mixed until a solution is achieved. A pH adjusting agent can be added to provide the composition with a pH of about 7 to about 8.

The wax composition can be applied to an automotive exterior surface by various application techniques including by spraying as a liquid or as a foam, by using an applicator cloth or pad where the liquid wax composition is applied to the applicator pad or cloth and is then applied to the automotive exterior surface. The wax composition can be rubbed into or onto the automotive exterior surface. It is expected that various types of pads or cloths can be used to wipe the wax composition into or onto the automotive exterior surface. In general, the pad or cloth should be relatively lint free and resist scratching the automotive exterior surface. A preferred type of cloth that can be used can be referred to as a microfiber cloth. In addition, it is expected that much of the wax composition will be rubbed off of the automotive exterior surface, but it is expected that an amount will remain on the automotive exterior surface.

The wax composition can be applied to various vehicles to restore and/or maintain the vehicle surface. Exemplary vehicles include cars, trucks, boats, airplanes, buses, trains, ships, and trailers. In addition, it is expected that the wax composition can be applied to various non-vehicle surfaces to help restore or maintain a desired appearance. Exemplary non-vehicle surfaces include hard surfaces such as shower stalls, counters, floors, walls, furniture, and appliances. It is expected that the wax composition can be used to provide dust control on surfaces, and to coat metal surfaces to restore gloss and to provide reduced corrosion of the metal surface. It is expected that the wax composition may find application as a composition applied during a waxing step in a automatic vehicle washing facility. That is, it is expected that the wax composition may replace currently available compositions used to apply a "waxy finish" to vehicles in vehicle washing facilities.

The wax composition can be provided in the form of a ready to use composition for application to a vehicle surface. When the wax composition is provided in a form that can be foamed through a mechanical foaming head, exemplary ranges of the various components are identified in Table 1.

TABLE 1

Ready to Use Composition

| Component | First Range (wt. %) | Second Range (wt. %) | Third Range (wt. %) |
|---|---|---|---|
| Wax component | 0.01-20 | 0.1-10 | 0.2-5 |
| Double Tail Surfactant | 0.01-20 | 0.1-10 | 0.2-5 |
| Water | 30-99.9 | 60-99 | 80-98 |
| Foam Boosting Solvent | 0.1-5 | 0.2-4 | 0.3-3 |

Example 1

Effect of Double Tail Surfactant and Foam Boosting Solvent

The compositions identified in Table 2 were prepared and then tested for foamability by dispensing from a spray bottle and a gauze foamer spray head available from Zeller Plastik. The solubilization of the wax emulsion under neutral conditions occurred when a double-tail surfactant was used. Under acidic conditions, adequate solubilization was obtained without the need for a double tail surfactant but the pH was undesirable for a leave-on product like a detailing wax. The below data also illustrates the use of a foam-boosting solvent to enhance foamability of a wax composition through a mechanical foamer spray head. The weight percents identified in Table 2 reflect the identified components at a 100% active or solid level.

TABLE 2

| Components | A (wt. %) | B (wt. %) | C (wt. %) | D (wt. %) | E (wt. %) | F (wt. %) |
|---|---|---|---|---|---|---|
| dipropylene glycol methyl ether | 0 | 0.5 | 0.5 | 0.5 | 0.5 | 0.5 |
| sodium dodecylbenzene sulfonate | 0.3 | 0.3 | 0.3 | 0 | 0 | 0 |
| didecyldimethylammonium chloride | 0 | 0 | 0 | 0 | 0 | 0.3 |
| hexadecyltrimethylammonium | 0 | 0 | 0 | 0.3 | 0 | 0 |

TABLE 2-continued

| Components | A (wt. %) | B (wt. %) | C (wt. %) | D (wt. %) | E (wt. %) | F (wt. %) |
|---|---|---|---|---|---|---|
| chloride | | | | | | |
| laureth/myristeth-7 | 0 | 0 | 0 | 0 | 0.3 | 0 |
| Tomah C-340 wax emulsion* | 2.0 | 2.0 | 2.0 | 2.0 | 2.0 | 2.0 |
| 2-amino-2-methyl-1-propanol | 0 | 0 | 0.03 | 0.03 | 0.03 | 0.03 |
| water | 97.7 | 97.2 | 97.17 | 97.17 | 97.17 | 97.17 |
| pH | 3-4 | 3-4 | 7-8 | 7-8 | 7-8 | 7-8 |
| appearance | clear | clear | cloudy | cloudy | cloudy | cloudy |
| foam | none | good | none | none | none | good |

*Tomah Products, Incorporated

The components sodium dodecylbenzene sulfonate, hexadecyltrimethylammonium chloride, and laureth/myristeth-7 can be characterized as non-double tail surfactants. Those non-double tail surfactants resulted in compositions having either too low of a pH or a cloudy appearance. It is believed that a clear appearance reflects a composition that is more stable to phase separation.

Example 2

Comparison of Foam Detailing Wax with Commercially Available Products

Composition F from Example 1 was sprayed as a foam onto a vertical test panel and then removed by wiping. Hard water spots present on the panel were removed and the gloss of the door restored to its original gloss by wiping. Table 3 compares composition F with three commercially available products.

TABLE 3

| Product | Streaking | Clear | Wax/Oil (per label) | pH | Foamable via a mechanical foaming head |
|---|---|---|---|---|---|
| Meguiars Next Generation Spray Wax | Yes | No | polymers | 7-8 | No |
| Turtle Wax Express Shine | Yes | No | carnauba wax, silicone | 7-8 | No |
| Mothers California Gold Showtime Instant Detailer | No | No | unknown | 7-8 | No |
| Composition F, Example 1 | No | Yes | carnauba wax | 7-8 | Yes |

Example 3

Field Evaluation of Foam Detailing Wax

Figure 2:
FIG. 2 is a photograph showing a foamed, wax composition according to the invention provided on the automobile surface of FIG. 1.
Figure 3:
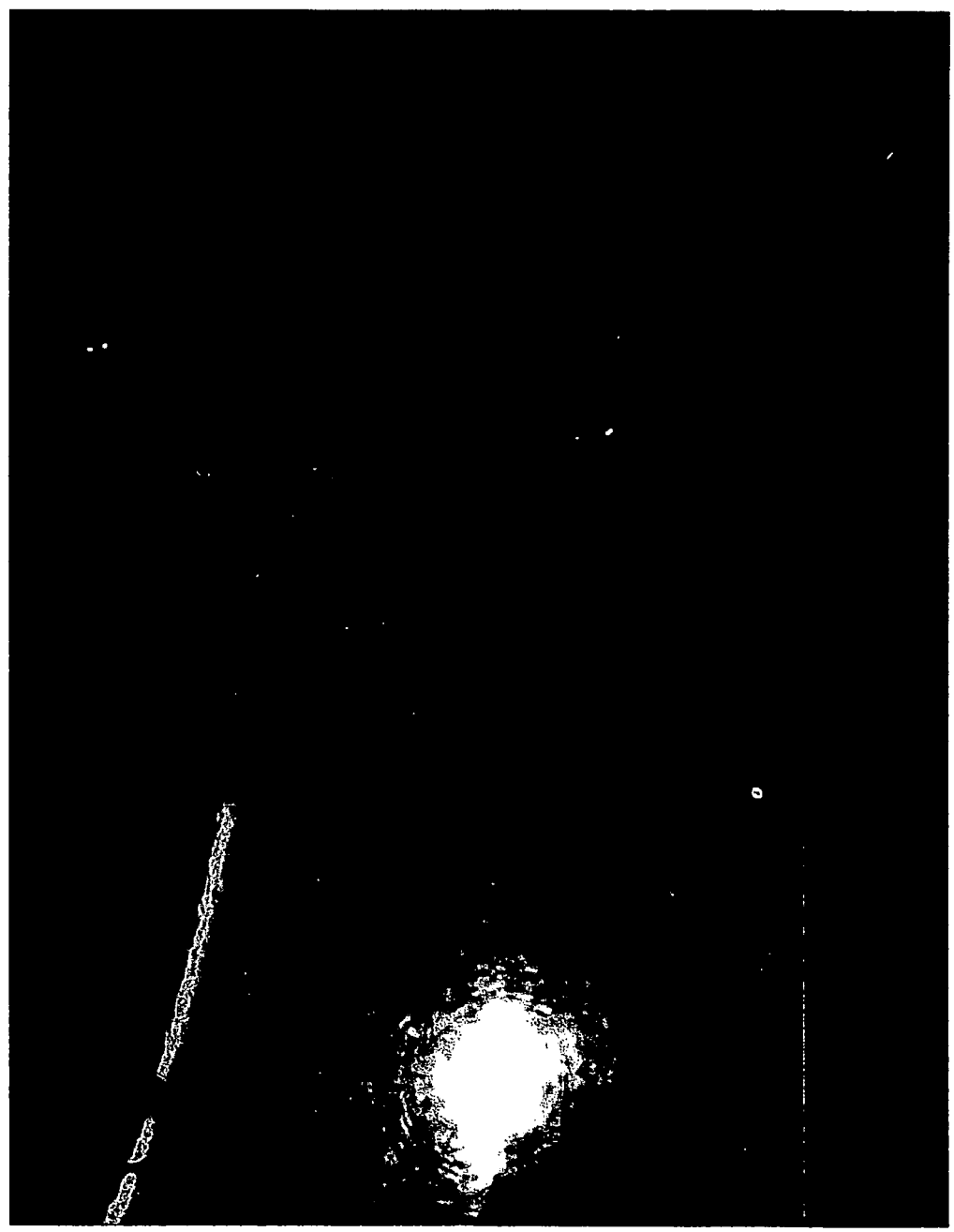
FIG. 3 is a photograph showing the automobile surface of FIG. 1 after the wax composition has been wiped off.

Composition F from Example 1 was applied to a car surface. The photograph provided as FIG. 1 shows a painted car surface that has been dulled as a result of water spotting. FIG. 2 shows the same car surface after application of the foam wax composition. FIG. 3 shows the same car surface after the wax composition has been rubbed into the car surface. The below photographs (FIGS. 1-3) illustrate the ability of the foaming detailing wax to restore a car surface to its original shine.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A ready to use detailing wax composition comprising:
   (a) about 0.1 wt % to about 10 wt % of a wax component comprising at least one of carnauba wax, beeswax, polyethylene, copolymers of polyethylene, oxidized polyethylene, copolymers of oxidized polyethylene, silicones, derivatives of silicones, polyethers, montan waxes, or natural waxes;
   (b) a double tail surfactant component comprising a surfactant having the structure:

$R_1\text{-}A\text{-}R_2$ wherein R1 and R2 can be the same or different, and are independently $C_6$ to $C_{24}$ groups, and A comprises a charged or uncharged moiety, wherein the weight ratio of the wax component to the double tail surfactant component on a solids basis is about 0.1 to about 1.5;
   (c) about 80 wt % to about 98 wt % water; and
   (d) about 0.1 wt. % to about 5 wt. % of a foam boosting solvent, wherein the wax composition is capable of being foamed without the use of a propellant, and wherein the wax is applied directly to a vehicle surface without being diluted.

2. A wax composition according to claim 1, further comprising:
   (a) a sufficient amount of a pH adjusting agent to provide the composition with a pH of about 6 to about 8.

3. A wax composition according to claim 1, wherein the foam boosting solvent comprises a glycol ether having the formula:

$$R\text{---}(OCHCH_2)_n\text{---}OH$$
$$\phantom{R\text{---}(OC}|$$
$$\phantom{R\text{---}(OCHC}R'$$

wherein R is a $C_1$-$C_8$ aliphatic or aromatic group, R' is H, $CH_3$, or $C_2H_5$, and n has a value of at least one.

4. A wax composition according to claim 1, wherein the foam boosting solvent has an HLB value of at least about 6.9 and an OHLB of about 12 to about 20.

5. A wax composition according to claim 1, wherein the foam boosting solvent has a vapor pressure at room temperature of less than about 5 mmHg.

6. A wax composition according to claim 1, wherein A comprises at least one of an alkoxylate, a derivative of an alkoxylate, a glycoside, a derivative of a glycoside, an amide, an amine, a salt of an amine, a derivative of an amine, a carboxylate, a sulfate, a sulfonate, a quaternary nitrogen, a sulphur, a phosphorus, a sultaine, a betaine, an amphoacetate, an amphoproprionate, or an amine oxide.

7. A wax composition according to claim 1, wherein the double tail surfactant component is present in an amount of about 0.01 wt. % to about 20 wt. % on a solids basis of the wax composition.

8. A wax composition according to claim 1, wherein the weight ratio of the wax component to the double tail surfactant component is between about 0.2 and about 1.25.

9. A ready to use foam wax composition comprising:
  (a) about 0.1 wt % to about 10 wt % of a wax component comprising at least one of carnauba wax, beeswax, polyethylene, copolymers of polyethylene, oxidized polyethylene, copolymers of oxidized polyethylene, silicones, derivatives of silicones, polyethers, montan waxes, or natural waxes;
  (b) a surfactant component comprising a double tail surfactant having the structure:

$R_1$-A-$R_2$ wherein $R_1$ and $R_2$ can be the same or different, and are independently linear $C_6$ to $C_{24}$ groups, and A comprises a charged or uncharged moiety;
  (c) about 80 wt % to about 98 wt % water; and
  (d) about 0.1 wt. % to about 5 wt. % of a foam boosting solvent;
wherein the foam wax composition exhibits at least 50 wt. % foam according to a 15 second vertical separation test after foaming in a mechanical foaming head, and wherein the wax composition is applied to a vehicle surface without being diluted.

10. A foam wax composition according to claim 9, further comprising:
  (a) a sufficient amount of a pH adjusting agent to provide the composition with a pH of about 6 to about 8.

11. A foam wax composition according to claim 9, wherein the foam boosting solvent comprises a glycol ether having the formula:

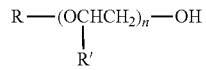

wherein R is a $C_1$-$C_8$ aliphatic or aromatic group, R' is H, $CH_3$, or $C_2H_5$, and n has a value of at least one.

12. A foam wax composition according to claim 9, wherein the foam boosting solvent has an HLB value of at least about 6.9 and an OHLB of about 12 to about 20.

13. A foam wax composition according to claim 9, wherein the surfactant component is present at a level of about 0.01 wt. % to about 20 wt. % on a solids basis.

14. A foam wax composition according to claim 9, wherein the surfactant comprises a double tail surfactant and the weight ratio of the wax component to the double tail surfactant component on a solids basis is about 0.1 to about 1.5.

* * * * *